United States Patent
Greulich et al.

[11] 3,795,211
[45] Mar. 5, 1974

[54] REMOTELY ACTIVATED POWER SWITCH FOR SEWING MACHINES

[75] Inventors: Robert G. Greulich, Cranford; John W. Casner, Elizabeth; John A. Urciola, South Bound Brook, all of N.J.

[73] Assignee: The Singer Company, New York, N.Y.

[22] Filed: May 7, 1973

[21] Appl. No.: 358,239

[52] U.S. Cl. ............................................ 112/219 A
[51] Int. Cl. ............................................. D05b 69/10
[58] Field of Search 112/219 A, 219 R, 220, 218 R, 112/67, 87, 258

[56] References Cited
UNITED STATES PATENTS
3,253,563  5/1966  Myers ........................... 112/220
3,367,296  2/1968  Harruff ......................... 112/219 A Primary Examiner—H. Hampton Hunter
Attorney, Agent, or Firm—Marshall J. Breen; Chester A. Williams, Jr.

[57] ABSTRACT

A position selector means located on the standard of a sewing machine and coupled by a pitman means to an electrical power switch mounted on an insulated motor housing carried by the base of a sewing machine is disclosed. The power switch is connected in an electrical path adapted to couple the electrical power source to the drive motor, and the position selector and pitman means are insulated from this electrical path.

6 Claims, 4 Drawing Figures

PATENTED MAR 5 1974 3,795,211

3,795,211

REMOTELY ACTIVATED POWER SWITCH FOR SEWING MACHINES

BACKGROUND OF THE INVENTION

The present invention relates to sewing machines, and in particular, to a remotely activated and electrically insulated power switch for the operation thereof.

In the prior art, the switch that couples the source of electrical power to the drive motor is generally located in a position accessible to the operator on the sewing machine base, standard, or arm. Since the switch is always located in a electrical current path coupled from the source of power to the motor, at least one terminal of the switch has power line voltage thereon. This presents a safety hazard to an operator, since a switch failure (electrical insulation breakdown) can subject the operator to an electrical shock. Accordingly, there has been developed a set of safety standards wherein electrical isolation and/or double insulation is required of any electrical component that an operator may contact.

The present invention overcomes the shortcomings of the prior art by providing a power switch that is affixed within an insulated motor housing and is coupled by a pitman means to a remotely located position selector means which are electrically insulated from the power switch, thereby, providing complete separation of the electrical current path and the selector means.

SUMMARY OF THE INVENTION

A sewing machine, utilizing the principles of the present invention, comprises a frame means, including a base, a standard, a head, and an arm, stitch forming instrumentalities and work feeding mechanism, a main shaft operatively connected to the stitch forming instrumentalities and the work feeding mechanism, an electric motor mounted within an insulated housing and carried by the base means to drive the stitch forming instrumentalities and the work feeding mechanism, the electric motor being adapted to be energized from a source of electrical power, an electrical switch having at least two positions affixed to the insulated housing and located in an electrical path adapted to couple the electrical power to the motor, position selector means carried by the standard, and pitman means coupled from the position selector means to the electrical switch means and means electrically insulating the pitman and position selector means from the electrical path influenced by said electrical switch, whereby, electrical hazard is obviated incident to operator influence of the selector means which determines the position of the electrical switch.

DESCRIPTION OF THE PREFERRED EMBODIMENT

Figure 1:
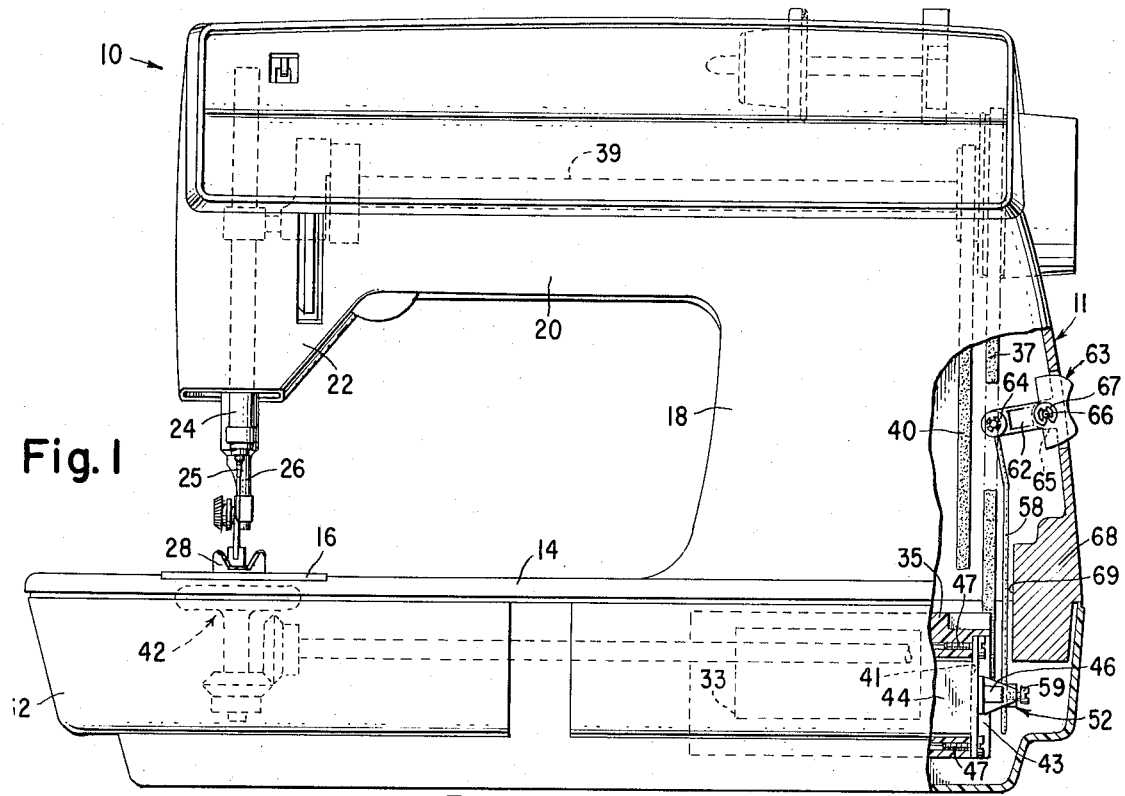
FIG. 1 is a front elevational view of a sewing machine, incorporating the principles of the present invention, with a portion of the frame cut away.
Figure 2:
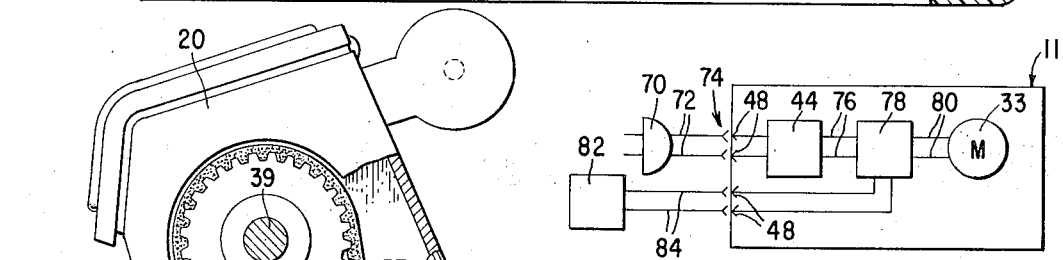
FIG. 2 is an end elevational view of a sewing machine with portions of the frame cut away to show the cooperation of the electrical switch, pitman means and selector means.

Referring to the drawing and in particular to FIG. 1, the invention is disclosed as being embodied in a sewing machine 10. The sewing machine 10, in which the present invention is incorporated, includes a frame 11 which has a substantially rectangular hollow base 12 having at its upper side a work supporting surface or bed 14 including therein a throat plate 16. Suitably secured upon the hollow base 12 is a vertically disposed hollow standard 18 which carries an overhead bracket-arm 20 terminating in a hollow head 22 in which is mounted a reciprocatory needle bar 24 carrying a needle 25. Also included in the hollow head 22 is a presser bar 26 which is terminated in a presser foot 28. Additionally included within the sewing machine frame is an electrical drive motor 33 mounted within an insulated housing 35 and carried in the base 12. The motor 33 is coupled, via a pulley 36 (FIG. 2) and belt coupling means 37, to a drive shaft 39. All of the items mentioned above are found on a conventional sewing machine as well as are stitch forming instrumentalities 42 cooperable with the needle 25 which are coupled to the drive shaft 39 via a second belt coupling means 40, all well known in the art.

In the preferred embodiment, in accordance with the principles of the present invention, the insulated motor housing 35 is formed with a recess 41 bordered by straight parallel sidewall ribs 43 within which recess an on-off power switch 44 is secured as by screws 47. The power switch includes an operating lug 46 which is movable in a path parallel to the recess sidewall ribs 43 between preferably three positions, i.e., off, low, and high speed ranges of motor operation in a conventional manner. The motor housing 35 is also provided with electrical terminals 48 (FIG. 2) which are adapted to mate with a connector 74 (FIG. 3), that is coupled to a source of electrical power. The electrical terminals 48 are also used to couple the circuitry of a remotely located foot controller 82 (FIG. 3), to the sewing machine motor 33.

The operating lug 46 of the power switch 44 is embraced loosely by an aperture 50 formed in one leg 51 of a Z-shaped bracket 52.

Figure 4:
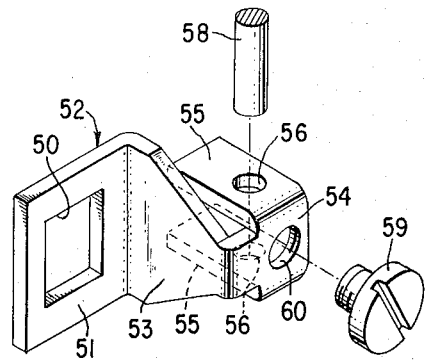
FIG. 4 is an enlarged perspective view of the bracket by which the pitman is connected to the electrical switch.

The bracket leg 51 is offset in one direction, as shown in FIG. 4, from a web portion 53, and a second leg 54 of the bracket is offset in the opposite direction from the web portion 53. Bent inwardly from each side of the second leg 54 are tabs 55 which are each formed with an aperture 56 for for accommodating a pitman wire 58, the pitman wire is secured to the bracket 52 by a clamping screw 59 which engages a threaded hole 60 in the bracket leg 54.

The other end of the pitman 58 is adapted to be inserted in a hole 61 provided in an extending arm portion 62 of a selector means 63 and retained therein by a retaining washer 64. In the preferred embodiment, the selector means 63 takes the form of a rocking lever pivoted on a boss 65 formed within the standard 18. The pivot is provided by a pin 66 retained within a hole provided in the boss 65. The rocking lever 63 is formed to embrace the pin 66 and is retained thereon by a C-shaped washer 67.

As shown in FIG. 1, the wire pitman 58 is extending from the selector means 63 to the bracket 52 passes inside and closely adjacent to a boss 68 formed within the machine frame standard 18. The boss 68 presents a guide surface 69 which faces opposite to and is substantially parallel to the sidewall rib 43 on the switch accommodating recess 41 in the motor housing. With this arrangement, the sewing machine frame guides the pitman wire so as to constrain the bracket 52 with the one leg 51 thereof within the recess 41 of the motor housing and the aperture 50 in embracing relation over the power switch lug 46. The web portion 53 of the bracket will be disposed against the sidewall rib 43 bordering the motor housing recess 41 so as to guide the bracket 52 for movement smoothly between the various switch positions without binding.

Figure 3:
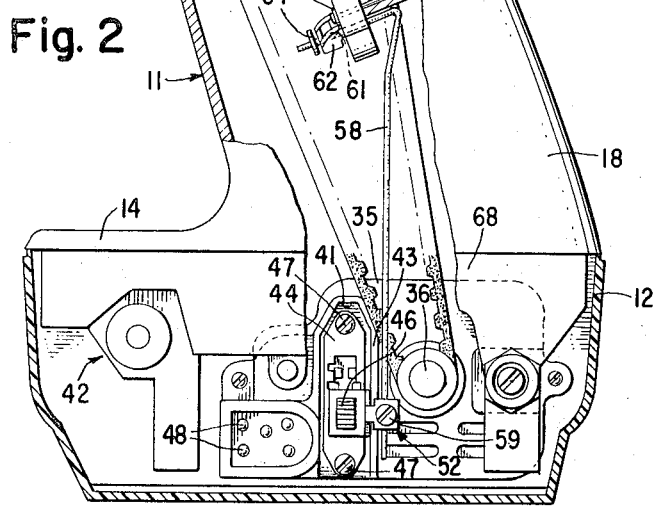
FIG. 3 is a simplified block diagram of a typical electrical system for a sewing machine embodying the present invention.

A simplified block diagram of a typical electrical system for a sewing machine is shown in FIG. 3. A plug 70 is adapted to be accommodated into a receptacle for a conventional source of electrical power such as a wall outlet, not shown, and provides an electrical path, via leads 72, mating connector 74, and terminals 48 to the electrical switch 44. The switch 44 is coupled, via leads 76, to a motor speed control circuit assembly 78 which is coupled, via leads 80, to the motor 33. The conventional operator actuated controller 82 is coupled, via leads 84 and terminals 48 to the motor speed control circuit assembly 78 to enable the operator to control the speed of the sewing machine motor in a conventional manner.

In operation, a machine operator may change the position of the electrical switch 44 by changing the position of the rocking lever or selector means 63, thereby readying the sewing machine for electrical operation and selecting the operating speed range. Manufacturing switch operating lug 46, the bracket 50, the pitman 58, or any combination of these parts, of an electrical insulating material will completely isolate the electrical switch from the operator. Therefore, if a breakdown of the electrical switch insulation should occur a shock hazard will not be presented to the operator of the sewing machine.

Having thus set forth the nature of the invention, what is claimed is:

1. A sewing machine having a frame, stitch forming instrumentalies carried in said frame, an electric motor adapted to be energized from a source of electrical power for driving said stitch forming instrumentalities, an insulated motor housing, means for securing said motor housing on said sewing machine frame, an electrical switch affixed to said insulated motor housing and located in an electrical current path adapted to couple said source of electrical power to said motor, an operator influenced position selector, means for securing said position selector on said sewing machine frame independently of said motor housing, pitman means coupling said position selector to said electrical switch means, and means for electrically insulating said position selector from said electrical current path in which said electrical switch is located.

2. A sewing machine as set forth in claim 1 wherein said electrical switch on said motor includes a shiftable switch operating lug, and wherein said pitman means is coupled to said electrical switch means by a bracket member which is formed with an aperture adapted to embrace said shiftable operating lug and with clamp means for securing said bracket member to said pitman means.

3. A sewing machine as set forth in claim 2 in which guide means are provided on said motor housing substantially parallel to the path of said shiftable switch operating lug, and in which a web portion is formed on said bracket member for cooperative engagement with said guide means.

4. A sewing machine as set forth in claim 3 in which said motor housing is formed with a recess accommodating said electrical switch means, and in which said guide means comprises a sidewall rib of said recess.

5. A sewing machine as set forth in claim 3 in which a guide surface for said pitman means is provided on said sewing machine frame substantially parallel and opposite to said guide means on said motor housing for constraining said bracket member in embracing relation with said switch operating lug.

6. A sewing machine as set forth in claim 2 in which the means for electrically insulating said position selector from said electrical current path in which said electric switch is located comprising the fabrication of at least one of the interengaged switch operating lug, bracket member, and pitman means from an electrically insulating material.

* * * * *